United States Patent [19]

Taig

[11] 4,429,777
[45] Feb. 7, 1984

[54] AUTOMATIC LOCKING AND ADJUSTMENT ASSEMBLY

[75] Inventor: Alistair G. Taig, South Bend, Ind.

[73] Assignee: The Bendix Corporation, Southfield, Mich.

[21] Appl. No.: 291,646

[22] Filed: Aug. 10, 1981

[51] Int. Cl.³ .............................................. F16D 13/75
[52] U.S. Cl. ............................... 192/111 A; 192/99 S; 188/196 P
[58] Field of Search .............. 192/111 A, 99 S, 70.25; 188/196 P, 196 R, 198, 67; 74/501.5

[56] References Cited

U.S. PATENT DOCUMENTS 4,057,134 11/1977 Gatewood ...................... 192/111 A
4,068,750 1/1978 Gatewood ...................... 192/111 A
4,239,098 12/1980 Jacoponi ......................... 192/111 A

FOREIGN PATENT DOCUMENTS 577339 5/1946 United Kingdom ........... 192/111 A

*Primary Examiner*—Rodney H. Bonck
*Assistant Examiner*—James J. Merek
*Attorney, Agent, or Firm*—Raul D. Schoenle; Ken C. Decker

[57] ABSTRACT

An automatic locking and adjustment assembly for securing a cable (28, 34) to a lever 16 includes a housing (36, 38). A cage (42) cooperates with the housing (36, 38) to carry gripping means (40) engageable with the cable (28, 34) and the housing (36, 38). The cage (42) cooperates with the gripping means (40) to provide for movement therebetween when the gripping means (40) is engageable with the housing (36, 38).

7 Claims, 4 Drawing Figures

AUTOMATIC LOCKING AND ADJUSTMENT ASSEMBLY

This invention relates to an automatic locking and adjustment assembly for a cable control. An example of such a cable control is a cable used to connect a clutch pedal with a clutch release lever in a vehicle. More particularly, the invention provides an assembly to adjust for lining wear in a clutch assembly by adjusting the relative settings of the cable and the release lever.

In a clutch assembly, a clutch pedal is connected to a cable which, in turn, is connected to a clutch release lever, so that when the pedal is actuated the cable pulls the release lever to disengage the clutch. Linkage adjusters have been provided between the pedal and the lever to accommodate lining wear for the clutch plate. However, these linkage adjusters have required a stop or an abutment to control releasing the cable during its adjustment relative to either the pedal or the lever.

The present invention provides an automatic locking and adjustment assembly for fixing a cable to a housing which includes a variable setting relative to the cable, the housing including a cam, a gripping means engageable with the cam and the cable to fix the latter to the housing, a cage carrying the gripping means relative to the housing and the cable, a first resilient member biasing the housing to an initial setting relative to the cable and a second resilient member biasing the gripping means to a first position relative to the cage, the cable being movable slightly relative to the housing away from a rest position setting to fixedly engage the gripping means with the cam and the cable, characterized by said cage frictionally engaging said cable to carry said gripping means in spaced relation to said cam when said cable is in its rest position and said cage defining a lost motion connection for carrying said gripping means, said lost motion connection permitting said cage to move slightly relative to said cable when said cable is moved slightly relative to said housing under cable loaded conditions and said lost motion connection permitting said cage to move with said cable at a different rate of travel than said gripping means when said cable is returned to its rest position.

It is an advantage of the present invention that the automatic locking and adjustment assembly is solely responsive to operation of the clutch, so that a release stop is not required.

In FIG. 1 a clutch assembly is shown wherein a cable assembly connects a clutch pedal with a clutch release lever;

Figure 1:
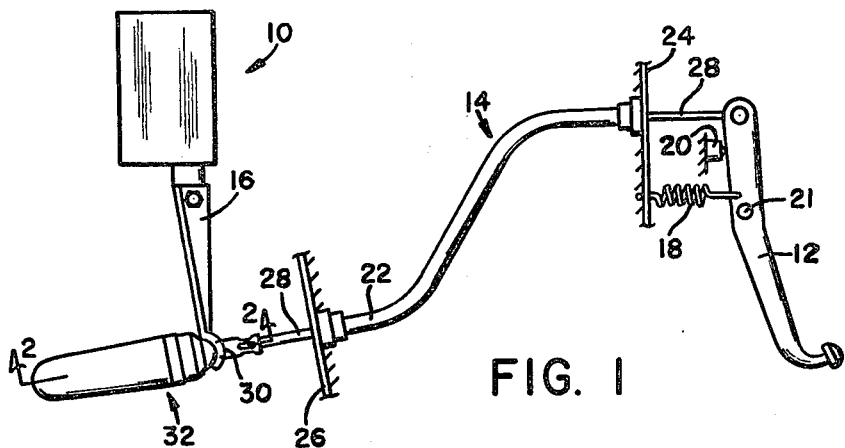

A clutch assembly 10 is coupled to a clutch pedal 12 via a cable assembly 14 which connects the pedal 12 with a release lever 16. A spring 18 biases the pedal to a rest position abutting a stop 20. The cable assembly 14 includes a conduit 22 which is fixed to a firewall support 24 near the pedal 12 and an engine support 26 near the lever 16. The conduit 22 receives the cable 28 so that the cable is movable within the conduit 22. The end of the lever 16 remote from the clutch assembly 10 includes an opening 30 for receiving the cable 28 and an automatic locking and adjustment assembly 32 is disposed on the cable 28 at the remote end of the lever 16.

Figure 2:
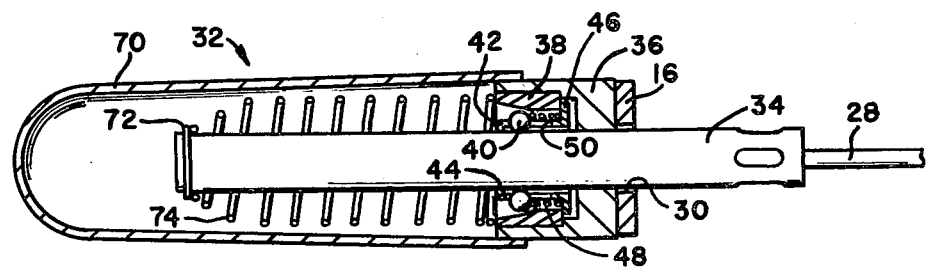
FIG. 2 is an enlarged cross section of the locking and adjustment assembly shown in FIG. 1.

Turning to FIG. 2, the end of the cable 28 includes a rod 34 extending through the opening 30 and cooperating with the automatic locking and adjustment assembly 32. The assembly 32 includes a housing 36 engageable with the lever 16, a cam 38 carried by the housing, a plurality of balls 40 engageable with the cam 38 and the rod 34, and a cage 42 carrying the balls 40 relative to the cam 38 and the rod 34. The cage 42 includes a first end 44 frictionally engaging the rod 34 and a second end 46 forming a spring seat flange. A spring 48 extends from the flange 46 to the balls 40 to bias the latter to the left end of slots 50 formed by the cage 42. The slots 50 are larger in an axial direction than the axial dimension of the balls so that the balls can move axially within the slots against the force of spring 48 in a manner hereinafter described. The flange 46 defines a diameter which is larger than the inner radial end of cam 38 so that the cam retains the cage within the housing 36. Also, in the rest position the flange 46 is abutting the cam 38. The housing defines a stepped bore 60 with a first section 62 substantially matching the opening 30, a second section 64 receiving the flange 46 and a third section 66 securing the cam 38.

A light weight dust cover 70 is carried by the housing 36 to protect the assembly 32 and a spring seat 72 on the end of rod 34 cooperates with a spring 74 so that the rod 34 and cable 28 are biased to a rest position, as shown in FIG. 2. In this rest position, the balls 40 are spaced from the cam 38 and abutting the left wall of slots 50.

Figure 3:
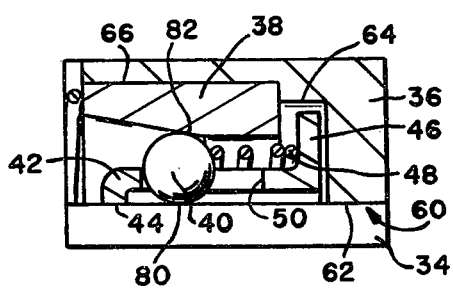
FIG. 3 is an enlarged view of a portion of FIG. 2 showing the assembly when the cable is initially applied.

When a vehicle operator steps on the clutch pedal 12 to disengage the clutch assembly, the cable 28 and rod 34 move to the right. In FIG. 3, the rod 34 moves relative to the housing 36. Because of the frictional engagement between the cage end 44 and the rod 34, the cage 42 and balls 40 move to the right, thereby engaging the balls 40 with the cam 38. The cam 38 is designed with a predetermined degree of elasticity so that when the balls engage the cam, the moving rod 34 will slightly rotate the balls 40 in a counterclockwise direction as the strain is taken up between the rod, balls and cam. With the balls 40 rotating counterclockwise viewing FIG. 3, the bottom edge 80 will travel with the rod 34 to the right and the top edge 82 will remain in contact with the cam 38. Consequently, the center of the ball 40 will move one-half the distance traveled by the bottom edge. Therefore, the ball 40 will cause the cage 42 to move to the left on the rod 34 to an adjusted position. When maximum cable load is reached, the ball 40 will tightly engage the cam and rod so that further movement of the cable will move the release lever to a position disengaging the clutch assembly via a connection formed by ball 40, cam 38 and housing 36.

Figure 4:
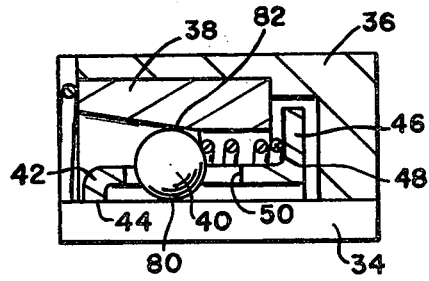
FIG. 4 is an enlarged view similar to FIG. 3 showing the cable returning to its rest position.

When the clutch is to be engaged again, the pedal 12 is released so that the cable 28 and rod 34 move to the left under the action of the clutch spring (not shown) to permit the release lever 16 to return to its engaged position. If no clutch lining wear occurs, the lever 16 will return to the same position. At this position, the lever 16 will not transfer forces to the housing 36 so that the springs 74 and 18 will operate to move the cable to its rest position. Movement of the rod 34 to the left relative to the housing 36 causes the cage 42 to move with the rod 34. Initially, the balls 40 rotate clockwise with the bottom edge 80 moving to the left with rod 34 and the top edge 82 rolling along the cam 38. This rolling and rotation of the balls causes the balls to move relative to the cage 42 to an intermediate position within the slots 50, see FIG. 4. Thereafter, the flange 46 is brought into engagement with the cam 38. The last increment of movement for the cable and rod to abut the pedal 12 with its stop 20 results in the balls 40 rolling out of tight engagement with the cam 38 and rod 34, so that the spring 48 will bias the balls to return to their left position within slots 50 to provide the gap between the balls and the cam. However, the last increment of movement for the rod 34 causes the rod to move relative to the cage as the cage flange is now abutting the cam 38. Consequently, the cage is returned to its original position on the rod 34.

If clutch lining wear occurs, the release lever 16 will form or define an adjusted setting further to the left of support 26 than what is shown in FIG. 1, albeit a slight variation thereof. The housing 36 and the cam 38 will also be moved to the adjusted setting. As a result, the gap between the balls 40 and the cam 38 will be smaller so that when the clutch pedal is actuated to disengage the clutch assembly 10, the balls 40 will almost immediately engage the cam 38 and begin to roll. The cage 42 will be moved to the left relative to the rod 34 during initial movement of the rod 34 to the right. When the rod 34 is returned to the left to engage the clutch assembly 10, the housing 36 and the cam 38 will return to their adjusted position by the action of the clutch spring (not shown) within assembly 10 acting against the release lever 16. With the housing 36 and cam 38 returning to their adjusted position, the spring 74 biases the rod 34 to continue moving to the left and the cage 42 moves with the rod relative to the cam and housing. The cage 42 will move with the rod until the flange 46 abuts the cam 38, but since the cam is moving to its adjusted setting, the cage 42 will be permitted to move slightly to the left of the rest position shown in FIG. 2 on the rod 34. The cage moves with the rod 34 to abut the cam 38, thereby establishing the predetermined gap between the balls 40 and the cam 38.

So long as the clutch plate lining wear does not exceed the clearance defined between the flange 46 and the cam 38, the assembly 32 will be able to compensate for this lining wear with a single clutch pedal actuation.

In the preferred embodiment, the cam 38 is made of hardened steel, but its expansion under load provides for rolling of the balls 40 before a tight fit is established between the cam 38, the balls 40 and the rod 34. Also, the cam forms an angle of 10° relative to the longitudinal axis of the rod 34. Also, the preferred housing 36 is made of plastic to allow expansion of the steel cam.

Other versions of the device are possible wherein the balls are replaced by rollers, or the cam can be a conical or tapered member attached to the cable end and adjustment is made within a steel tube housing.

I claim:

1. An automatic locking and adjustment assembly for fixing a cable to a housing which includes a variable setting relative to the cable, the housing including a cam, gripping means engageable with the cam and the cable to fix the latter to the housing, a cage carrying the gripping means relative to the housing and the cable a first resilient member biasing the housing to an initial setting relative to the cable and a second resilient member biasing the gripping means to a first position relative to the cage, the cable being movable slightly relative to the housing away from a rest position setting to fixedly engage the gripping means with the cam and the cable, characterized by said cage frictionally engaging said cable to carry said gripping means in spaced relation to said cam when said cable is in its rest position and said cage defining a lost motion connection for carrying said gripping means, said lost motion connection providing for said cage to move relative to said cable when said cable is moved relative to said housing and said lost motion connection also providing for said cage to move with said cable at a different rate of travel than said gripping means when said cable is returned to its rest position.

2. The automatic locking and adjustment assembly of claim 1 in which said cage cooperates with said cam to limit movement of said cage in one direction.

3. The automatic locking and adjustment assembly of claim 1 in which said cage defines at least one slot and said gripping means is movable within said one slot.

4. The automatic locking and adjustment assembly of claim 1 in which said cage is movable relative to said cable when said gripping means initially engages said cam.

5. An automatic locking and adjustment assembly for moving a lever with a cable, the lever having a variable setting relative to the cable, the assembly comprising a housing engageable with the lever and defining an opening for movably receiving the cable, gripping means cooperating with the cable and the housing to fix the cable to the housing in response to movement of the cable, a cage cooperating with the housing and the gripping means to carry the latter relative to the housing, the cage being engageable with the cable to move therewith, the gripping means cooperating with the cage to adjust the position of the latter relative to the cable when the cable is moved, the cage being movable relative to the cable when the latter is moved in one direction and the gripping means is initially engageable with the housing, and the cage being movable relative to the gripping means when the cable is moved in an opposite direction to the one direction.

6. The automatic locking and adjustment assembly of claim 5 in which the gripping means is movable relative to the cage in the direction of cable movement and a resilient member biases the gripping means to a rest position relative to the cage.

7. An automatic locking and adjustment assembly for fixing a cable to a housing which includes a variable setting relative to the cable, the housing including a cam, gripping means engageable with the cam and the cable to fix the latter to the housing, and a cage carrying the gripping means relative to the housing and the cable, the cable being movable slightly relative to the housing away from a rest position setting to tightly engage the gripping means with the cam and the cable, characterized by said cage frictionally engaging said cable to carry said gripping means in spaced relation to said cam when said cable is in its rest position and said cage defining a lost motion connection with said gripping means, said lost motion connection providing for said cage to move relative to said cable when said cable is moved away from the rest position and said lost motion connection also providing for said cage to move with said cable at a different rate of travel than said gripping means when said cable is returned to its rest position.

* * * * *